United States Patent
New et al.

(10) Patent No.: US 11,033,780 B2
(45) Date of Patent: Jun. 15, 2021

(54) AUTONOMOUS TENNIS BALL RETRIEVAL ROBOT

(71) Applicants: Rachel Natasha New, Palo Alto, CA (US); William Jiajun Wu, Palo Alto, CA (US)

(72) Inventors: Rachel Natasha New, Palo Alto, CA (US); William Jiajun Wu, Palo Alto, CA (US)

( * ) Notice: Subject to any disclaimer, the term of this patent is extended or adjusted under 35 U.S.C. 154(b) by 0 days.

(21) Appl. No.: 16/030,728

(22) Filed: Sep. 17, 2018

(65) Prior Publication Data
US 2020/0086182 A1    Mar. 19, 2020

(51) Int. Cl.
*A63B 47/02* (2006.01)
*G05D 1/02* (2020.01)

(52) U.S. Cl.
CPC .......... *A63B 47/02* (2013.01); *G05D 1/0246* (2013.01); *G05D 2201/02* (2013.01)

(58) Field of Classification Search
CPC . A63B 47/02; A63B 47/021; A63B 2047/022; A63B 47/024; A63B 47/025; A63B 2047/027; A63B 2047/028; G05D 1/0246; G05D 2201/02

USPC ................. 473/431, 432, 459, 460
See application file for complete search history.

(56) References Cited

U.S. PATENT DOCUMENTS

| | | | |
|---|---|---|---|
| 8,313,396 B1* | 11/2012 | Mailman | A63B 47/021 473/460 |
| 9,758,305 B2* | 9/2017 | Johnson | B25J 11/008 |
| 2014/0294547 A1* | 10/2014 | Guo | A63B 47/021 414/507 |
| 2015/0328503 A1* | 11/2015 | Vilar | A63B 47/021 473/460 |
| 2016/0243970 A1* | 8/2016 | Eletrabi | G05D 1/0891 |
| 2016/0310817 A1* | 10/2016 | Yeager | A63B 47/02 |
| 2017/0232323 A1* | 8/2017 | Shi | A63B 69/38 124/78 |
| 2017/0312588 A1* | 11/2017 | Jennings | A63B 47/021 |
| 2018/0272197 A1* | 9/2018 | Askenazi | A63B 47/002 |
| 2018/0312095 A1* | 11/2018 | Eletrabi | A63B 47/021 |
| 2020/0070015 A1* | 3/2020 | Zhang | G05D 1/0214 |

OTHER PUBLICATIONS

"VEX Nothing But Net—2015-2016 published 2016: \ VEX Robotics Competition Game"; https://www.youtube.com/watch?v=A8daR6qBw3M.*

* cited by examiner

*Primary Examiner* — William V Gilbert

(57) ABSTRACT

An autonomous robot that collects tennis balls on a tennis court surface and transfers them into a tennis ball shooter.

7 Claims, 5 Drawing Sheets

AUTONOMOUS TENNIS BALL RETRIEVAL ROBOT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The teaching of the game of tennis is most often accomplished by a tennis teacher repeatedly serving tennis balls upon a tennis court surface for a student to hit. However, in order to achieve proficiency in the sport, the student will often choose to practice additionally outside of lessons.

Commercial machines such as the one outlined in U.S. Pat. No. 3,777,732 have already been developed for the purpose of automatically pitching tennis balls to a student practicing alone. These machines generally consist of a tennis ball storage container leading into a shooting mechanism that gradually depletes the amount of stored tennis balls as it fires them. However, the extended use of these machines results in a multitude of tennis balls strewn across the playing surface, and practice sessions must be periodically interrupted to retrieve the scattered tennis balls and return them to the machine.

There have been many attempts to develop an apparatus for the purpose of facilitating the retrieval of tennis balls dispersed on a tennis court surface. For example, U.S. Pat. No. 3,593,868 details an apparatus that can be moved across a tennis court by applying force to a handle located on the device. By using a brush element to sweep tennis balls into a receiving chamber as the apparatus is moved across the court's surface, the machine eliminates the need to bend down and retrieve each individual tennis ball, and by doing so, vastly reduces the amount of time needed to collect them. However, moving the machine across the tennis court surface still requires significant human labor. Once collected, returning the tennis balls to a tennis ball shooter requires additional work, as the removal of the device's receiving chamber is not trivial, and after removal the chamber must be lifted and emptied into the tennis ball shooter. Thus, the time and labor spent deviating from the student's intent to practice have merely been reduced rather than eliminated.

Alternatively, U.S. Pat. No. 3,371,950 illustrates an apparatus for retrieving tennis balls wherein the apparatus is placed over tennis balls located on a court surface, and downward pressure is applied. The pressure causes the apparatus to automatically expand around the tennis balls, and upon being lifted, the apparatus reverts to its original state, automatically transporting the tennis balls from the ground into the storage receptacle in the process. The device is designed with an open top, allowing collected tennis balls to be easily poured into a tennis ball shooter. While the apparatus places more focus on the ability to quickly transfer tennis balls from its storage receptacle into a tennis ball shooter, it sacrifices collection convenience in the process, as the apparatus must be manually carried to each individual tennis ball. Consequently, the apparatus again merely reduces some of the effort that is undertaken by the student in collecting and depositing the tennis balls.

While manual machines place their focus on aiding human labor in an effort to reduce it, autonomous robots are geared towards all but eliminating the need for manual labor with regard to fundamental tasks and repetitive actions. These robots have already found their use in an abundance of household chores as illustrated in U.S. Pat. Nos. 5,940,927 and 20,140,180,478 which disclose an autonomous surface-cleaning robot and an autonomous snow-clearing robot. U.S. Pat. No. 20,100,250,024 additionally proposes the application of autonomous robots to sports by detailing an autonomous robot with the function of retrieving golf balls.

With autonomous robots clearly finding their uses in the worlds of households and sports, the present invention utilizes methods for efficiently collecting multiple balls scattered across a tennis court and efficiently depositing them into a tennis ball shooter, all done autonomously to eliminate the need for a student's time and labor.

BRIEF SUMMARY

The autonomous tennis ball retrieval robot (hereinafter 'robot') collects tennis balls on a tennis court surface and transfers them into a tennis ball shooter. The robot comprises a motive drive system operable to navigate across the tennis court surface, a storage receptacle to contain the collected tennis balls, a pickup assembly to collect the tennis balls into the robot, and a deposit assembly to transfer the tennis balls from the robot's storage receptacle to the tennis ball shooter. The robot uses vision tracking to navigate to tennis balls in order to collect them and, in one aspect, robot vision tracking can be used to accurately transfer tennis balls into the tennis ball shooter. Accordingly, several advantages of one or more aspects are as follows:
 a. The robot provides a means for efficiently collecting a multitude of tennis balls scattered across a tennis court surface.
 b. The robot automatically transfers the collected tennis balls into a tennis ball shooter, thereby eliminating the need for a student using a tennis ball shooter to periodically stop practice and collect the tennis balls scattered as a result.
 c. The robot can detect people and avoid colliding with them while fulfilling its operations.
 d. The present invention provides a means to accurately transfer collected tennis balls into a tennis ball shooter using a combination of robot vision tracking and a predefined target.

DETAILED DESCRIPTION

Figure 1A:
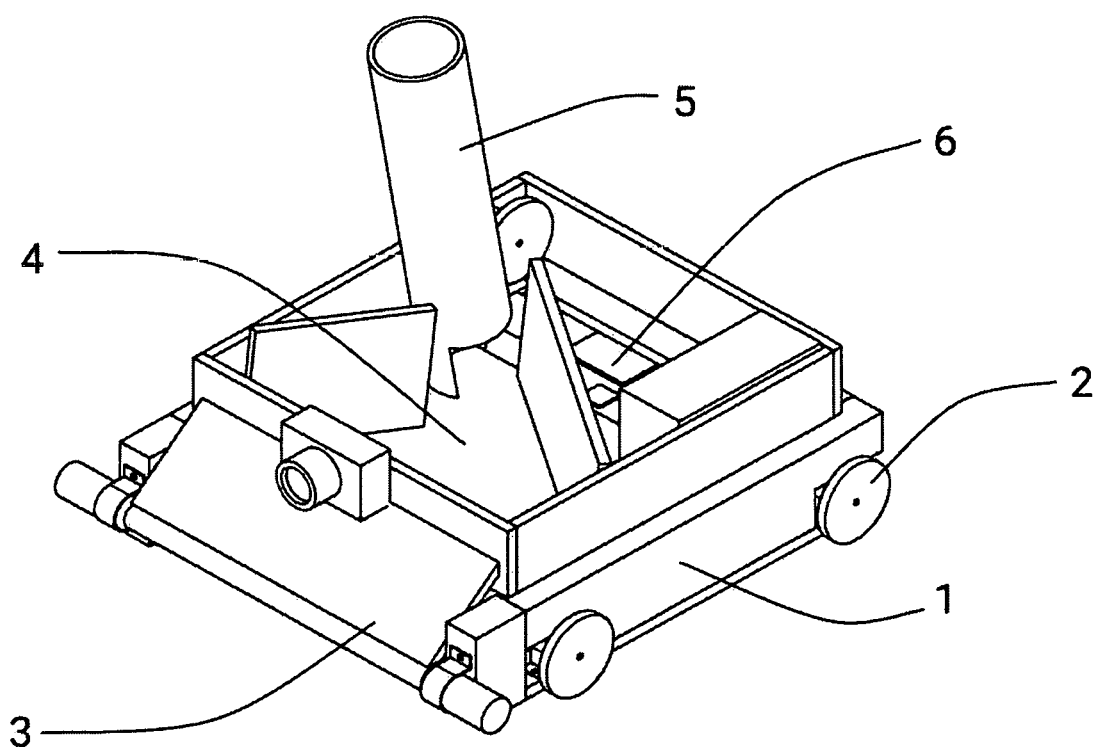
FIGS. 1A, 1B, and 1C show the autonomous tennis ball retrieval robot from an angled view, lateral view, and the top view respectively.
Figure 1B:
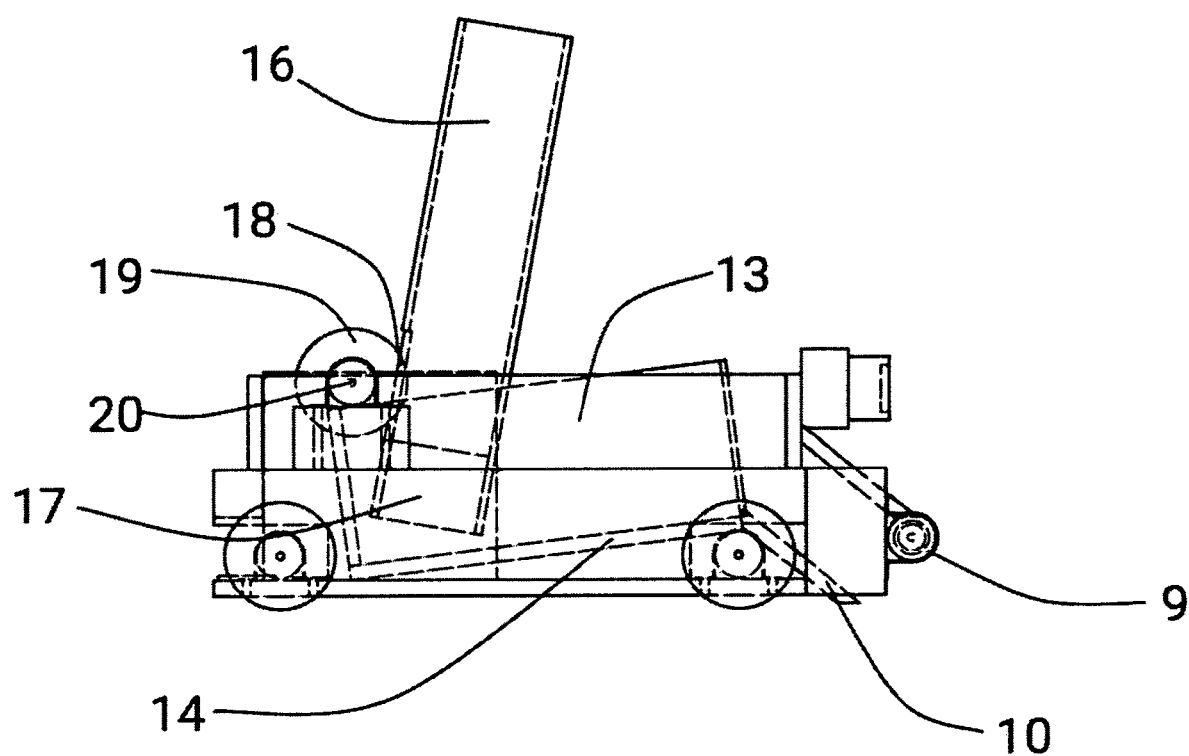
Figure 1C:
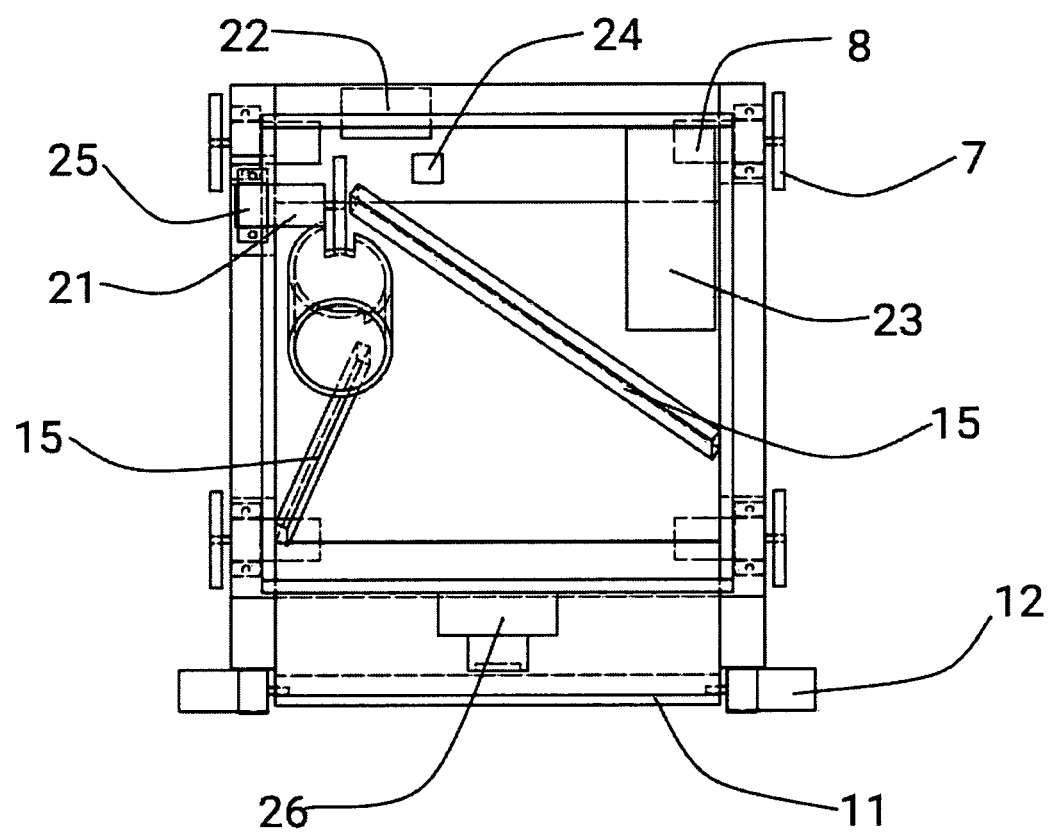

Robot Mechanical Design (FIGS. 1A, 1B, and 1C)

One embodiment of the autonomous tennis ball retrieval robot is illustrated in FIGS. 1A (angled view), 1B (lateral view), and 1C (top view). The robot is comprised of a chassis (1), a drive system (2), a pickup assembly (3), a storage assembly (4), a deposit assembly (5), and a control system (6). For the purposes of this specification, the term 'front' in the context of the robot will refer to the side of the robot in which the pickup assembly (3) is attached.

The robot's four-wheel drive system (2) is mounted to the chassis (1) wherein each wheel (7) is directly attached to an individual electric gearhead motor (8). The wheels (7) are of sufficient diameter to ensure that when the robot is placed on a tennis court surface the chassis (1) does not come in contact with the ground, while remaining small enough to ensure that the robot's pickup assembly (3) is effective. Any gearhead motor configuration and placement are sufficient, provided the robot can navigate as quickly as possible while still able to accurately detect and move towards tennis balls on the tennis court surface.

The pickup assembly (3) comprises an intake roller (9) and an intake ramp (10), both mountable to the front of the chassis (1). The intake roller (9) has a generally cylindrical base of inflexible material surrounded by a layer of malleable or textured material such as rubber. The cylindrical core is mounted to an axle (11) so it rotates about its center axis, and the axle (11) is in turn attached to an electric motor (12). The intake roller (9) is mounted above the ground such that its outer edge is a certain distance under the diameter of a tennis ball (2.57-2.70 inches) above the ground. This distance, as well as the pickup assembly's (3) rpm and the angle and placement of the intake ramp (10), is inconsequential provided that the pickup assembly (3) is able to effectively transfer tennis balls from a tennis court surface into the robot's storage assembly (4).

The storage assembly (4) itself comprises a storage receptacle (13) with a ramp (14) as its base. The storage receptacle (13) is constructed with any material inflexible enough to contain a multitude of tennis balls such as plastic, sheet metal, or plywood. Plates of this material are used to form a container able to store a minimum number of 15 tennis balls to ensure that the robot can operate efficiently. In addition, the receptacle (13) must be constructed in a way that it funnels the tennis balls it contains towards the tennis ball opening (17) in the shooter frame (16) which is described in further detail in the following paragraph. In this particular embodiment, this is done using a ramp (14) angled from the top of the intake ramp (10) to the base of the shooter frame (16). Further funneling of the tennis balls is done using two more plates (15) mounted on the left and right of the storage receptacle (13) normal to the chassis (1). These plates (15) begin on either side of the intake ramp (10), and the gap between them gradually narrows until they end on either side of the tennis ball opening (17) in the shooter frame (16). The resulting assembly ensures that the left and right movement of the tennis balls contained within the storage receptacle (13) is restricted, causing them to funnel directly into the tennis ball opening (17) in the shooter frame (16).

In this embodiment, the deposit assembly (5) comprises a shooter frame (16) on which a flywheel (19) is mounted. The shooter frame (16) consists of a hollow cylinder composed of a light, inflexible material such as plastic. The shooter frame's (16) diameter must be sufficient to allow a single tennis ball to pass through without resistance but should remain small enough to ensure that the accuracy of the deposit assembly (5) is not inhibited by permitting the tennis ball too much freedom of movement. At the base of the shooter frame (16) are two openings: a tennis ball opening (17) just large enough to allow a single tennis ball to pass into the shooter frame (16) at a time, and a flywheel opening (18) in which the flywheel (19) mounted to the shooter frame (16) can contact the tennis ball, providing it with an initial velocity. The flywheel (19) itself is fixed to an axle (20) passing through its center axis, which is in turn attached to an electric motor (21). The assembly is then mounted to the shooter frame (16) in such a way that it can rotate freely. The distance the assembly is mounted above the chassis (1) is immaterial provided that the flywheel (19) supplies tennis balls in the deposit assembly (5) with sufficient initial velocity to exit the opposite end of the shooter frame (16) and land at a desired location within an acceptable margin of error.

In operation, the robot is capable of autonomously propelling itself across a tennis court surface retrieving and depositing tennis balls. When in autonomous mode, it utilizes information from its sensors and reacts accordingly to adequately execute its respective functions, namely the direction to take and when to deposit the tennis balls. To achieve this, the robot carries an appropriate control system (6), taking the form of a programmable microcontroller (22), a chargeable battery (23), and appropriate control circuitry and processing functionality to control electric motors and process signals received from its various sensors such as a gyroscope (24), an encoder (25), and at least one camera (26).

Operation of Robot Mechanical Design (FIGS. 1A, 1B, and 1C)

The manner of transporting tennis balls dispersed across a tennis court surface into a tennis ball shooter using the autonomous robot illustrated in FIGS. 1A, 1B, and 1C is as follows:

The robot's camera (26) locates tennis balls scattered across a tennis court surface using robot vision tracking. The robot uses its drive system (2) in communication with a gyroscope (24) to navigate towards the located tennis balls. When within range to contact a tennis ball, the intake roller (9) rotates at a predetermined rotational speed as the robot drives forward over the tennis ball. The compression and friction acting on the tennis ball from the intake roller (9) causes the tennis ball to travel up the intake ramp (10). Once moved up the intake ramp (10), gravity causes the tennis ball to automatically fall into the storage receptacle (13) where it is funneled towards the shooter frame (16).

When the robot stops retrieving tennis balls and prepares to shoot the ones it has stored, the flywheel (19) rotates at a constant speed using feedback from an encoder (25) sensor, compressing the tennis balls it comes in contact with and imparting them with an initial velocity, causing them to travel through the shooter frame (16) until they are released into the air at a desired velocity pre-calculated by the robot depending on its distance from the tennis ball shooter.

Figure 2:
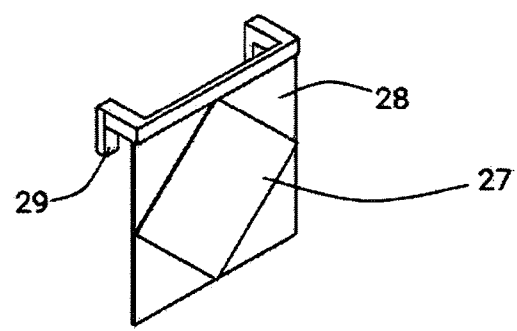
FIG. 2 shows an embodiment of a target that can be hung on a tennis ball shooter.

Vision Target First Embodiment (FIG. 2)

FIG. 2 depicts one embodiment of a distinct diamond shape (27) serving as an example of an object with a predefined shape, color, or other distinct characteristic that can be recognized by the robot's camera (26). In this particular embodiment, the diamond shape (27) is mounted to a supporting board (28) which is in turn attached to mounting hooks (29). The material of each component is inconsequential providing that the supporting material is distinguishable from the distinct diamond shape (27) by the robot's camera (26) and is able to support itself when hung over an edge.

Operation of Vision Target First Embodiment (FIG. 2)

The distinct diamond shape (27) serves the purpose of providing the robot's camera (26) with a means of determining its position relative to a tennis ball shooter. The target can be hung on the side of such a shooter using its mounting hooks (29). By using this method, the robot can determine what velocity and direction to shoot tennis balls at by using the size of the target as an indicator for the robot's distance away from the shooter, and the distance between the two side corners of the distinct diamond shape (27) as an indicator for the angle of the robot relative to the tennis ball shooter. This ability to determine what variable speeds to shoot the tennis balls at such that they will land in the shooter ensures that the robot can be used with a variety of different shooters of multiple sizes.

Figure 3:
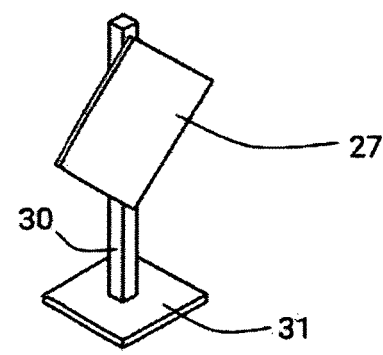
FIG. 3 shows an embodiment of a target that can be placed at a predetermined position on the tennis court.

Vision Target Alternative Embodiment (FIG. 3)

An alternative embodiment of the distinct diamond shape (27) is its being fixed to a supporting beam (30) which is, in turn, mounted such that it is normal to a supporting base (31). Thus, the structure can be placed in a predetermined position on a tennis court, allowing the robot's camera (26) to determine the robot's position relative to the tennis court in order for it to better navigate around the tennis court. This, coupled with the robot's gyroscope (24), provides a means for correcting noisy or drifting gyroscope (24) sensor data.

Figure 4:
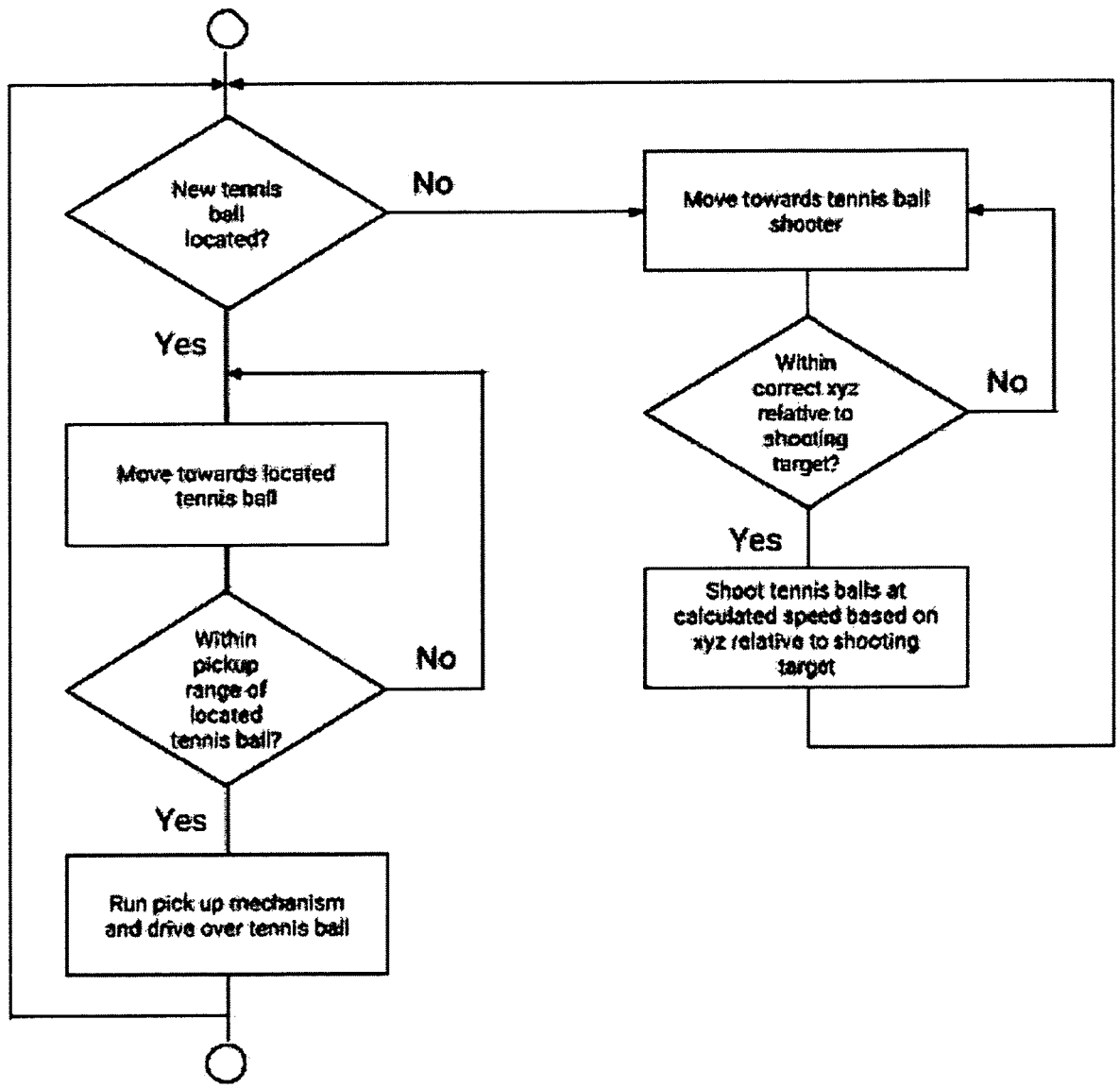
FIG. 4 shows a flowchart demonstrating the robot's autonomous control loop.

Control Overview (FIG. 4)

The robot operates autonomously using the decision-making path depicted in FIG. 4. The robot uses its camera (26) to determine the location of a tennis ball on the tennis court using a robot vision algorithm. If a tennis ball can be located, the robot will instruct the drive system (2) to move toward the closest tennis ball. If the robot comes within a predefined distance from the tennis ball, it will rotate the intake roller (9) and continue to drive over the tennis ball, thereby picking it up. Once the tennis ball has been picked up, the robot will attempt to locate another tennis ball. If another tennis ball is located, the robot will repeat the procedure above. However, if another ball cannot be located, the robot will navigate to the tennis ball shooter. When within a predefined area of the shooter, the robot will shoot balls at a speed calculated depending on the robot's exact location, which is determined using the size and orientation of the distinct diamond shape (27) as seen from the robot's current position. Once the robot has been shooting for a sufficient amount of time, it will begin the loop again by attempting to locate another tennis ball.

CONCLUSION

Accordingly, the reader will see that by constructing a robot with the ability to pick up, contain, and shoot tennis balls with accuracy, and by giving it the means to do so autonomously, practicing tennis with a tennis ball shooter is vastly more convenient. The robot can continuously pick up tennis balls as they are being scattered and eliminate the need to periodically stop practice to collect tennis balls to refill the tennis ball shooter.

Although the description above contains many specificities, these should not be constructed as limiting the scope of the embodiments but as merely providing illustrations of some of several embodiments. Thus, the scope of the embodiments should be determined by the appended claims and their legal equivalents, rather than by the examples given.

What is claimed is:

1. A method for collecting a plurality of tennis balls and transferring said plurality of tennis balls into a tennis ball shooter using an autonomous machine comprising:
   a. providing, a tennis ball machine configured to collect tennis balls having:
      a chassis, said chassis containing a four-wheel drive system, each wheel of said four-wheel drive system connected to an electric gearhead motor:
      a pickup assembly attached to a front of said tennis ball collection machine, said pickup assembly comprising an intake roller extending across said front and an intake ramp, said pickup assembly configured to collect said tennis balls;
      a storage assembly proximate said pickup assembly and configured to store said tennis balls via a receptacle;
      a shooter frame within said storage assembly, said shooter frame configured to launch a tennis ball of said collected tennis balls;
      said storage assembly having a ramp for a base, said ramp of said storage assembly angled from a top of said intake ramp to a base of said shooter frame, and at least one plate configured to funnel said collected tennis balls to an opening in said shooter frame,
   b. providing a vision sensor mounted to said tennis ball machine configured to provide an image data stream to a processor mounted to said tennis ball machine,
   c. operating said tennis ball machine on a level surface including:
      locating said plurality of tennis balls on said level surface using said vision sensor,
      navigating across said level surface to said plurality of tennis balls, collecting said plurality of tennis balls,
      navigating across said level surface to said tennis ball shooter, and transferring said plurality of tennis balls into said tennis ball shooter.

2. A tennis ball collection machine configured for autonomously collecting tennis balls comprising:
   a chassis, said chassis containing a four-wheel drive system, each wheel of said four-wheel drive system connected to an electric gearhead motor;
   a pickup assembly attached to a front of said tennis ball collection machine, said pickup assembly comprising an intake roller extending across said front and an intake ramp, said pickup assembly configured to collect said tennis balls;
   a storage assembly proximate said pickup assembly and configured to store said tennis balls via a receptacle;
   a shooter frame within said storage assembly, said shooter frame configured to launch a tennis ball of said collected tennis balls;
   said storage assembly having a ramp for a base, said ramp of said storage assembly angled from a top of said intake ramp to a base of said shooter frame, and at least one plate configured to funnel said collected tennis balls to an opening in said shooter frame.

3. The machine of claim 2 wherein the four-wheel drive system is controlled directly via remote control through an electronic device.

4. The machine of claim 2 wherein at least one vision sensor is arranged to provide an image data stream allowing said machine to locate and navigate to a plurality of tennis balls.

5. The machine of claim 2 wherein at least one vision sensor is arranged to provide an image data stream allowing said machine to locate and navigate to a tennis ball shooter.

6. The machine of claim 2 wherein at least one vision sensor is arranged to provide an image data stream allowing said machine to locate and navigate around people.

7. The machine of claim 2 wherein at least one vision sensor is arranged to provide an image data stream wherein information regarding the location of a tennis ball shooter can be determined through one or more processors, thereby allowing said shooting assembly to accurately launch said collected tennis balls into said tenses ball shooter.

\* \* \* \* \*